United States Patent
Hagihara et al.

(10) Patent No.: US 8,287,709 B2
(45) Date of Patent: Oct. 16, 2012

(54) METHOD AND DEVICE FOR IMMERSION TREATMENT OF VEHICLE

(75) Inventors: Yusuke Hagihara, Tokyo (JP); Masaki Takahashi, Tokyo (JP); Makoto Takayanagi, Tokyo (JP); Hideki Ikeda, Tokyo (JP); Naoya Kanke, Tokyo (JP); Tsukasa Yamanaka, Tokyo (JP); Takayuki Tahara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 343 days.

(21) Appl. No.: 12/530,213

(22) PCT Filed: Mar. 6, 2008

(86) PCT No.: PCT/JP2008/054559
§ 371 (c)(1),
(2), (4) Date: Apr. 20, 2010

(87) PCT Pub. No.: WO2008/111626
PCT Pub. Date: Sep. 18, 2008

(65) Prior Publication Data
US 2010/0200416 A1    Aug. 12, 2010

(30) Foreign Application Priority Data

Mar. 8, 2007  (JP) .................................. 2007-059178
Mar. 16, 2007 (JP) .................................. 2007-068828

(51) Int. Cl.
*C25D 13/12*   (2006.01)
*B65G 49/04*   (2006.01)

(52) U.S. Cl. .................. 204/512; 205/510; 205/623

(58) Field of Classification Search .................. 204/512, 204/623, 510
See application file for complete search history.

(56) References Cited

U.S. PATENT DOCUMENTS
5,364,469 A * 11/1994 Wakabayashi ................ 118/423

FOREIGN PATENT DOCUMENTS
JP  3037748    3/1997
JP  11-012798  1/1999

* cited by examiner

*Primary Examiner* — Kishor Mayekar
(74) *Attorney, Agent, or Firm* — Rankin, Hill & Clark LLP

(57) ABSTRACT

An immersion treatment method with which a vehicle body horizontally immersed in liquid is taken out in a tilted position. The vehicle body is taken out of the liquid at high speed in a tilted position. Foreign matter is separated from the vehicle body and removed together with the liquid.

16 Claims, 7 Drawing Sheets

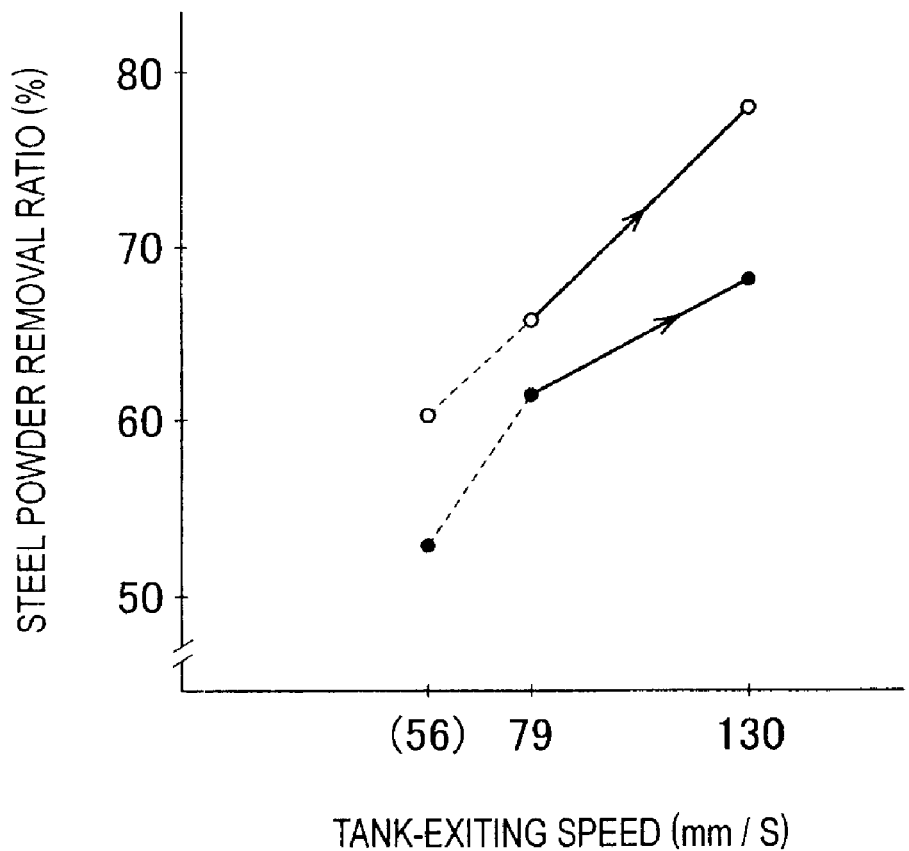

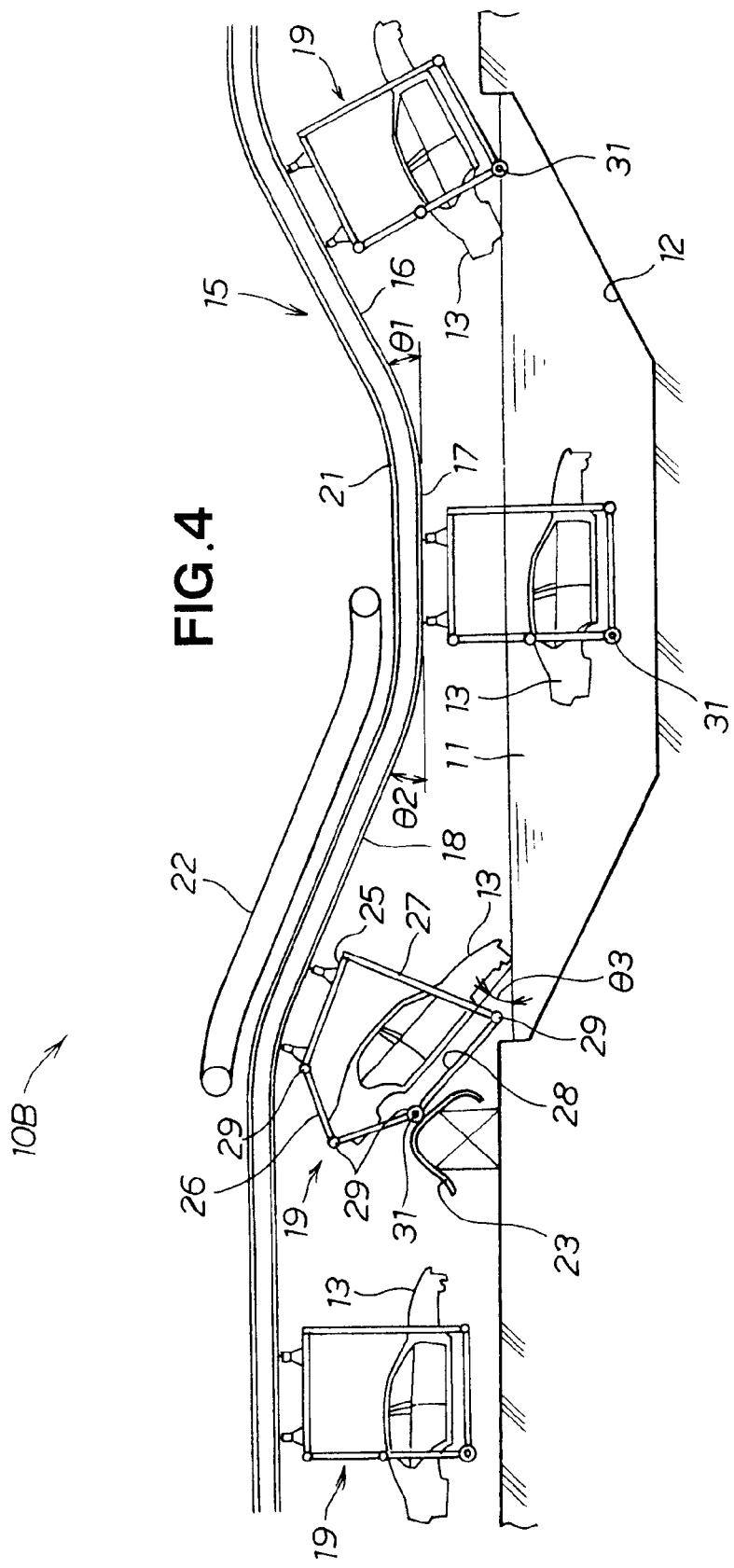

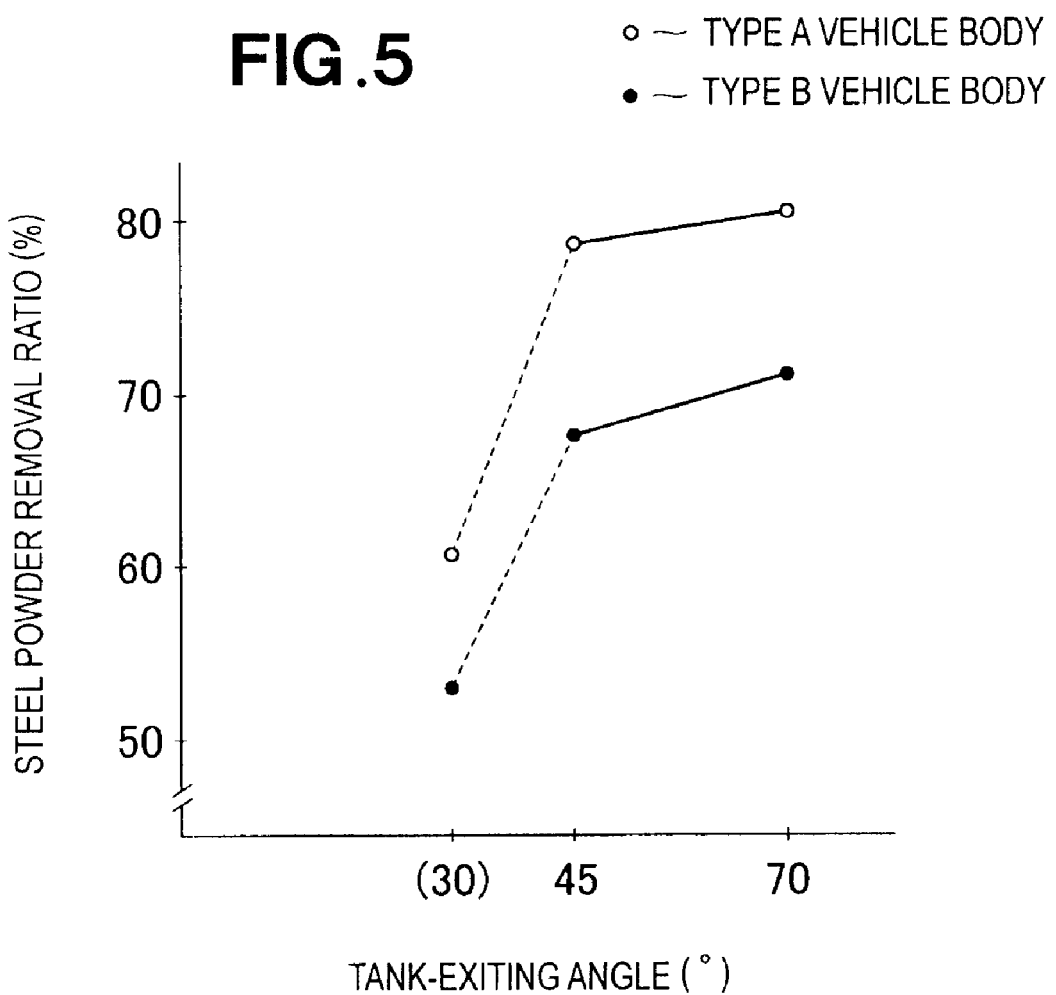

METHOD AND DEVICE FOR IMMERSION TREATMENT OF VEHICLE

TECHNICAL FIELD

The present invention relates to an immersion treatment technique for use in a coating line.

BACKGROUND ART

Generally, vehicle bodies passed through a welding stage are subjected to a coating process. For coating, first of all, cleaning and electrodepositing coating as base coating will be conducted. In this process, the electrodeposition coating, for example, is disclosed in Japanese Patent Application Laid-Open Publication No. 2002-097596 (JP 2002-097596 A). The technique disclosed in JP 2002-097596 A will be discussed with reference to FIG. 8 hereof.

As shown in FIG. 8, an immersion treatment apparatus 100 comprises a liquid storage tank 102 storing an electrodeposition liquid 101, and a vehicle body conveyance mechanism 105 for immersing vehicle bodies inclinedly into the liquid storage tank 102, conveying the vehicle bodies horizontally within the tank and pulling the vehicle bodies inclinedly out from the tank.

The vehicle body conveyance mechanism 105 comprises a downward-sloped guide rail 106, a horizontal guide rail 107 continuing from the downward-sloped guile rail 106, an upward-sloped guide rail 108 continuing from the horizontal guide rail 107, hangers 109 movably hung or suspended from the guide rails 106-108 for carrying vehicle bodies 103, and a power rail 111 for moving the hangers 109 from right to left as indicated by arrows in the FIG. 8.

Vehicle bodies 103 supported on the hangers 109 are guided by the downward-sloped guide rail 106 into the electrodeposition liquid 101. The vehicle bodies 103 are continuously conveyed by the horizontal guide rail 107 within the electrodeposition liquid 101 for achieving the required electrodeposition coating. Next, the vehicle bodies 103 are guided by the upward-sloped guide rail 108 out from the electrodeposition liquid 101.

By changing the electrodeposition liquid to a cleaning liquid, the vehicle bodies can be cleaned. Thus, the immersion treatment apparatus may be installed in the coating line, not only in that form having the electrodeposition tank but also in a form having the cleaning tank disposed forwardly (or rearwardly) of the electro-deposition tank.

Cleaning and coating vehicle bodies within a liquid is thus called immersion treatment.

In treating multiple vehicle bodies 103 continuously in the liquid storage tank 102, collision of adjacent vehicle bodies 103 should be avoided. To avoid such collision, it is desirable that the power rail 111 be moved at a constant speed.

It is known that if the moving speed is too high upon entry of the vehicle bodies into the liquid, the vehicle bodies 103 are liable to float. Thus, the moving speed should be set relatively low. If the moving speed is set low, the vehicle bodies are pulled out of the liquid at that low speed. It is desirable that foreign substances (dust and steel powders resulted from welding) remaining in the vehicle bodies 103 are removed together with the liquid as the vehicle bodies are pulled out of the liquid. However, if the moving speed is set low, only little foreign substances can be removed.

If chemical treatment or electrodeposition coating is conducted on steel plates with foreign substances adhered to surfaces of the steel plates, the quality of resultant chemical treatment film or electrodeposition coating is deteriorated significantly because such foreign substances are included in the chemical treatment film or electrodeposition coating.

Therefore, there is a demand for a technique to solve such a problem.

DISCLOSURE OF THE INVENTION

According to a first aspect of the present invention, there is provided a method for immersion treating a vehicle body, comprising the steps of: immersing the vehicle body inclinedly into one of an electrodeposition liquid contained in a liquid storage tank for electrodeposition coating and a cleaning liquid contained in the liquid storage tank for pre-coating cleaning; conveying the vehicle body within the liquid; and pulling the vehicle body inclinedly out from the liquid, characterized in that a speed at which the vehicle body is inclinedly pulled out from the liquid is set to be higher than a speed at which the vehicle body is conveyed within the liquid.

By pulling out the vehicle body inclinedly from the liquid at a high speed, liquid discharge is facilitated, and foreign objects can be removed together with the liquid. In particular, acceleration is generated by shifting from a low speed to a high speed and applied to the foreign objects to thereby separate the latter from the vehicle body.

According to a second aspect of the present invention, there is provided a method for immersion treating a vehicle body, comprising the steps of: immersing the vehicle body inclinedly into one of an electrodeposition liquid contained in a liquid storage tank for electrodeposition coating and a cleaning liquid contained in the liquid storage tank for pre-coating cleaning; conveying the vehicle body within the liquid; pulling the vehicle body inclinedly out from the liquid, characterized in that a tilt angle of the vehicle body as the latter is pulled out from the liquid is set to increase.

By changing the inclination angle, angular acceleration is produced and applied to foreign objects to thereby remove the latter from the vehicle body.

According to a third aspect of the present invention, there is provided an apparatus for immersion treating a vehicle body by immersing the vehicle body into one of an electrodeposition liquid for electrodeposition coating and a cleaning liquid for pre-coating cleaning, comprising: a liquid storage tank for storing the liquid; a vehicle body conveyance mechanism for conveying the vehicle body at a predetermined speed such that the vehicle body is inclinedly immersed into the liquid, conveyed through the liquid and inclinedly pulled out from the liquid; and a high-speed conveyance mechanism provided to the vehicle body conveyance mechanism, for conveying, as the vehicle body is inclinedly pulled out from the liquid, the vehicle body at a speed higher than the predetermined speed.

By pulling out the vehicle body inclinedly from the liquid at a high speed, liquid discharge is facilitated, and foreign objects can be removed together with the liquid. In particular, acceleration is generated by shifting from a low speed to a high speed and applied to the foreign objects to thereby separate the latter from the vehicle body.

Preferably, the apparatus further comprises a guide mechanism provided to the vehicle body conveyance mechanism for tilting the vehicle body such that an angle of inclination of the vehicle body after exiting the liquid becomes larger than an angle of inclination of the vehicle body before exiting the liquid. By largely inclining the vehicle body, liquid discharge is facilitated, and foreign objects can be removed efficiently together with the liquid.

Desirably, the guide mechanism is designed to cause the inclination angle of the vehicle body after exiting the liquid to increase continuously. Angular acceleration is produced by continuously varying the inclination angle and applied to foreign objects to remove the latter from the vehicle body.

BRIEF DESCRIPTION OF DRAWINGS

FIG. 3 is a graph showing a relationship between a tank-exiting speed and a ratio of steel powder removal;

FIG. 4 is a schematic view illustrating a separate embodiment of the apparatus of FIG. 1;

FIG. 5 is a graph showing a relationship between the tank-exiting speed and the ratio of steel powder removal;

BEST MODE FOR CARRYING OUT THE INVENTION

Figure 1:
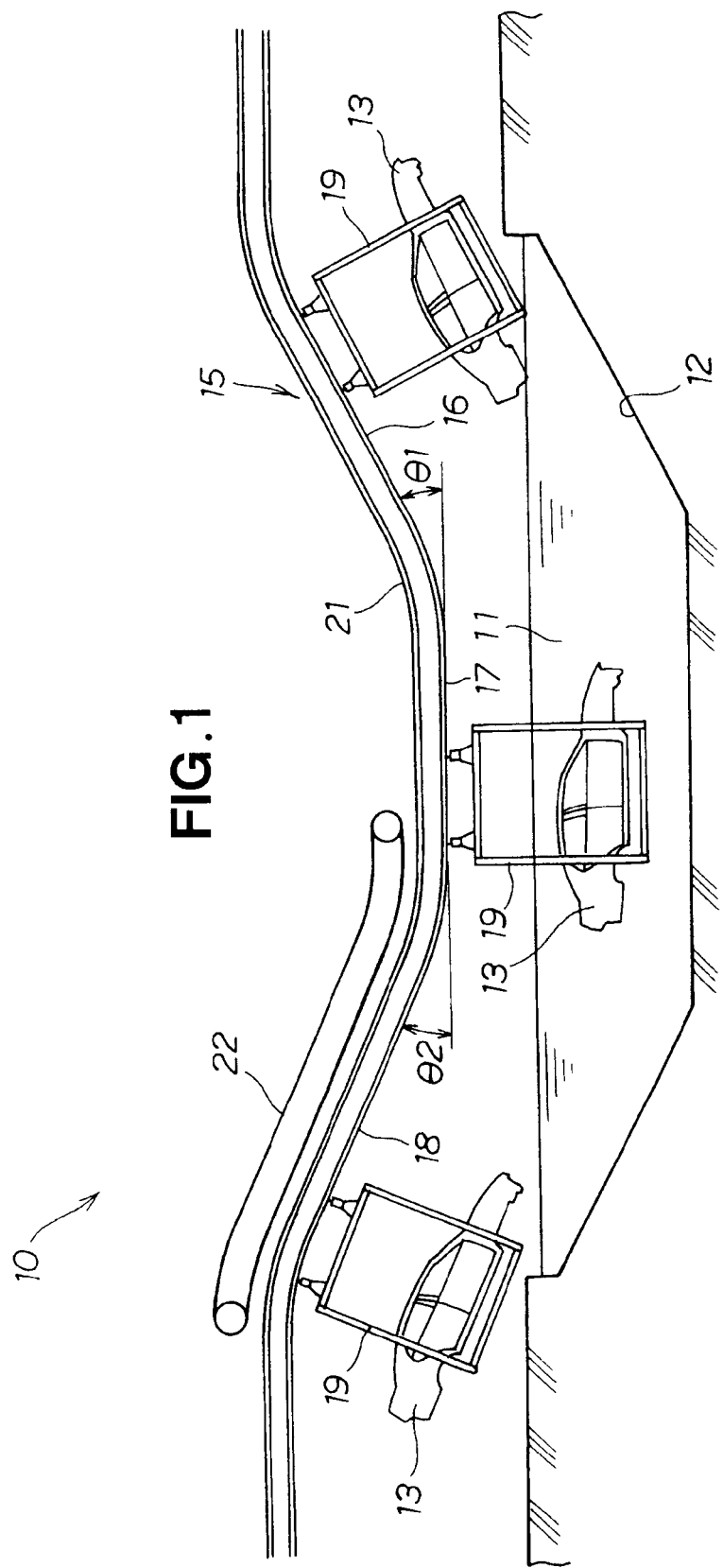
FIG. 1 is schematic view showing the basic arrangement of an immersion treatment apparatus for vehicle bodies according to the present invention.

As shown in FIG. 1, an immersion treatment apparatus 10 is comprised of a liquid storage tank 12 for storing an electrodeposition liquid 11, and a vehicle body conveyance mechanism 15 for immersing vehicle bodies 13 inclinedly into the tank 12, for conveying the vehicle bodies substantially horizontally within the tank and for then pulling the vehicle bodies inclinedly out from the tank.

The vehicle body conveyance mechanism 15 is comprised of a downward-sloped guide rail 16, a horizontal guide rail 17 continuing from the downward-sloped guide rail 16, an upward-sloped guide rail 18 continuing from the horizontal guide rail 17, hangers 19 movably suspended from the guide rails 16-18 for carrying the vehicle bodies 13, a low-speed conveyance mechanism 21 for moving the hangers 19 from right to left, and a high-speed conveyance mechanism 22 disposed in the vicinity of the upward-sloped guide rail 18.

Tilt or inclination angle of the downward-sloped guide rail 16, that is, a tank-entering angle θ1 and a tilt or inclination angle of the upward-sloped guide rail 18, that is, a tank-exiting angle θ2 are set to be the same or substantially the same.

Each vehicle body 13 supported on the respective hanger 19 is guided by the downward-sloped guide rail 16 into the electrodeposition liquid 11. Next, the vehicle body 13 is conveyed within the electrodeposition liquid 11 by the horizontal guide rail 17 so as to be applied with predetermined electrodeposition coating. Then, the vehicle body 13 is guide upward by the upward-sloped guide rail 18 to be pulled out of the liquid.

By changing the electrodeposition liquid 11 to a cleaning liquid, the vehicle body 13 can be cleaned. Thus, the immersion treatment apparatus 10 may be installed in the coating stage not only in the above-described form having the to electrodeposition tank but also in another form having the cleaning tank disposed forwardly or rearwardly of the electrodeposition tank.

Next, with reference to FIGS. 2A through 2E, description will be made as to how the vehicle body is pulled out of the liquid.

Figure 2A:
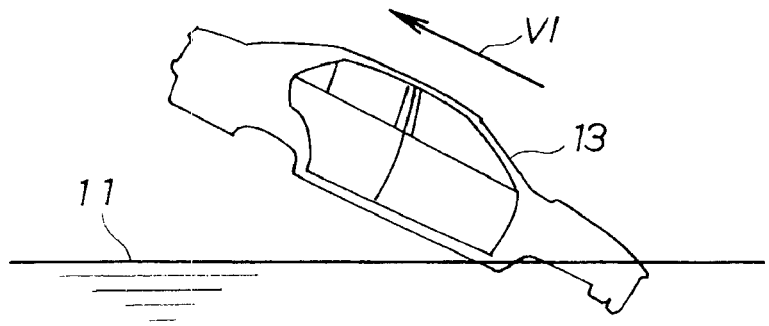
FIGS. 2A-2E are schematic views showing an operation of the immersion treatment apparatus.

As shown in FIG. 2A, before the vehicle body 13 is pulled out of the liquid 11, the vehicle body is moved inclinedly upwardly at a low tank-exiting speed (speed at which the vehicle body 13 exits the tank) Vl. The low tank-exiting speed Vl is provided by a low-speed conveyance mechanism 21 (FIG. 1).

The low tank-exiting speed Vl is a constant, ordinary tank-exiting speed (tank-exiting speed conventionally used in apparatuses of this type).

Figure 2B:
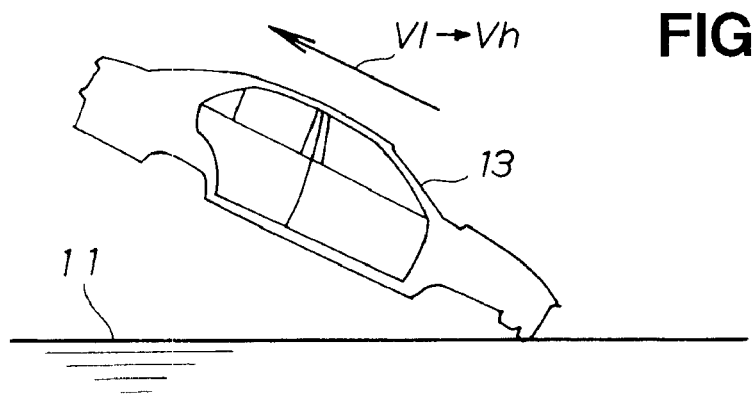

Turning now to FIG. 2B, as the vehicle body 13 exits the electrodeposition liquid 11, the tank-exiting speed is switched to a high tank-exiting speed Vh higher than the speed Vl at which the vehicle body is immerged in the liquid Vl. The high tank-exiting speed Vh is produced by a high-speed conveyance mechanism 22 (FIG. 1). The high tank-exiting speed Vh is set to be over 1.5 times, preferably 2.5 times, the ordinary or low tank-exiting speed.

Timing to switch the low-speed conveyance mechanism 21 to the high-speed conveyance mechanism 22 so as to vary the speed may be either when the vehicle body 13 is being immersed in the electrodeposition liquid 11 or when vehicle body 13 is turned from a horizontal conveyance state to an inclined conveyance state within the electrodeposition liquid 11.

Figure 2D:
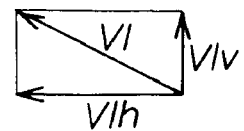
Figure 2C:
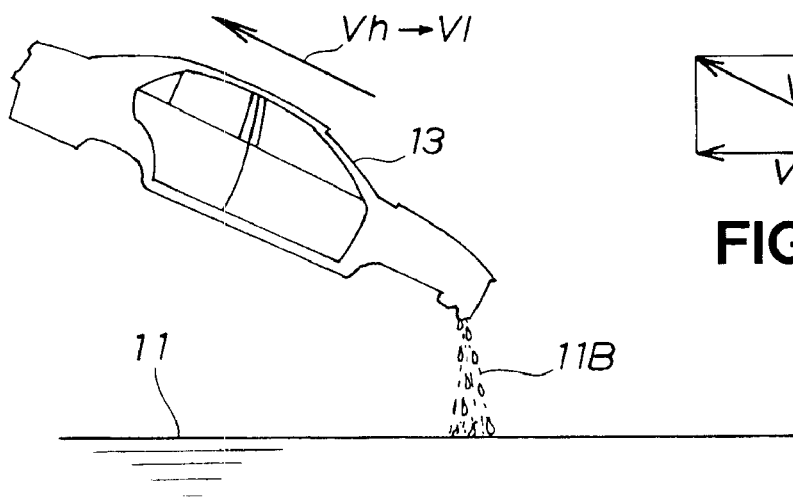

As shown in FIG. 2C, the vehicle body 13 is moved inclinedly upwardly at the high tank-exiting speed Vh, whereupon the electrodeposition liquid 11B remaining in the vehicle body 13 is discharged rushingly. The tank-exiting speed Vh may be switched to the low tank-exiting speed Vl at a position where the discharge of the electrodeposition liquid 11B is completed.

As shown in FIG. 2D, the low tank-exiting speed Vl comprises two separate components, namely, a vertical velocity component Vlv and a horizontal velocity component Vlh.

Figure 2E:
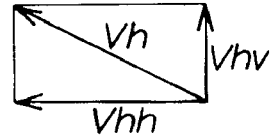

Turning to FIG. 2E, the high tank-exiting speed Vh comprises two separate components, namely, a vertical velocity component Vhv and a horizontal velocity component Vhh.

Next, description will be made as to a relationship between the tank-exiting speed and a ratio of steel powder removal.

The steel powder removal ratio should be construed as a value or values indicating to what extent steel powders or spatters resulted from MIG spot welding and left in the vehicle body 13 have been removed from the vehicle body 13 while the latter is inclinedly entered into the liquid storage tank, transferred horizontally within the tank and inclinedly pulled out of the liquid.

Experiments have been conducted on two different types of vehicle bodies, namely, on type A vehicle body and type B vehicle body. Vehicle body of type A is one having a middle cross member and a tire pan whose vertical surfaces are provided on a compartment side, making it relatively difficult to remove foreign objects. Vehicle body of type B is one in which a cross member forming part of the body is mounted to a lower part of a floor, making it relatively easy to remove foreign objects.

In FIG. 3, the horizontal axis represents the tank-exiting speed while the vertical axis represents a ratio of steel powder removal. Experiments have been conducted with the vertical velocity component Vlv (FIG. 2D) of the low tank-exiting speed Vl being set at (56) mm/s and with the vertical velocity component Vhv (FIG. 2E) of the high tank-exiting speed Vh being set separately at 79 mm/s and 130 mm/s.

Data obtained with the setting of (56) mm/s is shown for reference only. The steel powder removal ratio relative to both vehicle body A and vehicle body B increased in proportion to increase in the tank-exiting speed. For later processes, it is desirable that the vertical velocity component Vhv of the high tank-exiting speed Vh be set at 130 mm/s.

Reasons for the increase in the ratio of steel powder removal may include the followings. Steel powders are liable to injure external appearances of vehicles. Such steel powders stay still within the liquid by application of gravity, buoyancy and surface drag (friction resistance) of a steel plate. However, when the low speed Vl is changed to the high speed Vh with the steel plate placed in the liquid under a gravitational field, an accelerating force acts upon the steel plate and the steel powders. A resistive force of the liquid is also applied to the steel powders, thereby causing the steel powders to move on and over the steel plate. Furthermore, the steel powders move in accordance with the Stokes' law (law explaining that particles receive a force as they flow through a liquid and that the force varies with the shapes of the particles).

Different results as shown in FIG. 3 are assumed to have resulted from the differences in three-dimensional structures and positions of water drainage holes between the vehicle body of type A and the vehicle body of type B.

In the conducted experiments, only the vertical components Vlv, Vhv have been varied. Movement of the steel powders by acceleration can also be effected by varying the horizontal components Vlh, Vhh. That is, production of acceleration by changing the tank-exiting speed from Vl to Vh serves to swiftly discharge the electrodeposition liquid or cleaning liquid remaining in the vehicle bodies 13 from the latter.

Swift discharge of the electrodeposition liquid or cleaning liquid shortens the time required for liquid discharge and hence the coating line.

In the cleaning stage following the welding stage, steel powders and cleaning liquid remain in the vehicle bodies. By discharging the cleaning liquid at an increased speed, the steel powders can be discharged effectively. As a result, the cleaning quality is improved.

Referring next to FIGS. 4 and 5, a separate embodiment of the present invention will be described.

For like or same parts appearing in FIG. 1, like or same reference numerals will be used and their detailed discussion will be omitted. As shown in FIG. 4, the immersion treatment apparatus 10B differs from the apparatus of FIG. 1 in that it has hangers 19 altered to have the construction to be described below, and a guide mechanism 23 disposed shortly after the liquid storage tank 12.

Description will be made using the second-from-left hanger 19. The hanger 19 comprises an upper or top frame 25 suspended from the vehicle body conveyance mechanism 15, front and rear hanging members 26, 27 extending downwardly from respective front and rear ends (on left and right sides in the Figure) of the upper frame 25, and a lower or bottom frame 28 extending between lower or bottom ends of the front and rear hanging members 26, 27. Additionally, the front hanging member 26 is pivotally hinged at top, middle and bottom parts thereof, as at 29. Similarly, the rear hanging member 27 is hinged at a bottom part thereof, as at 29. The front hanging member 26 has a roller 31 rotatably disposed at a lower end thereof.

As the roller 31 is guided along the guide mechanism 23, the front hanging member 26 is bent or doglegged as illustrated in the Figure, thereby increasing the inclination or tilt angle of the lower frame 28. Stated otherwise, the tank-exiting angle θ3 is set to become increased as the tank-exiting angle θ2 at which the vehicle body 13 exits the electrodeposition liquid 11 becomes larger. That is, setting is made such that the tank-exiting angle θ3 after the vehicle body exited the electrodeposition liquid becomes larger than the tank-exiting angle θ2 before exiting of the vehicle body from the liquid. Such setting can be easily practiced by adjusting the profile or configuration of the guide mechanism 23.

Next, discussion will be made as to the results of an investigation on a relationship between the tank-exiting velocity and a ratio of steel powder removal.

As shown in FIG. 5, the investigation was made with the small tank-exiting speed θ2 set at (30)° (the vertical speed component being set at 56 mm/s) and the large tank-exiting speed θ3 set at 45° and 70° (the vertical speed component being set at 130 mm/s).

Data obtained with the setting of (30)° is shown as a reference only because the tank-exiting speed is largely different from others. With the larger settings of the tank-exiting angles, good steel power removal ratios have been produced on vehicle bodies of types A and B.

Reasons for the increase in the steel powder removal ratios may include the followings. By change from small to large of the angles at which the vehicle bodies exits the liquid, the gravitational effect to move the steel powders has been improved. Additionally, by change from small to large of the tank-exiting angle of the vehicle bodies, the velocity of water flowing over the floors of the inclined vehicle bodies has been increased. The steel powders leave the steel plates by acceleration generated by the gravity and water and are then swiftly discharged outside the vehicle bodies owing to the water flow velocity increased in correspondence with the increase in the angles at which the vehicle bodies exit the liquid or tank. Angular acceleration further facilitates discharge of the electrodeposition liquid or cleaning liquid still remaining in the vehicle bodies from the latter.

In the apparatus shown in FIG. 4, arrangements are made such that by the operation of the high-speed conveyance mechanism 22, the tank-exiting speed at which each vehicle body exits the electrodepostion liquid 11 becomes higher than the speed of conveyance of the vehicle body immersed in the liquid, and such that by the operation of the guide mechanism 23, the tank-exiting speed θ3 after the vehicle body exited the electrodeposition liquid 11 becomes larger than the tank-exiting speed θ2 at which the vehicle body is conveyed through the liquid. That is, the apparatus is characterized in that the tank-exiting speed grows larger as the vehicle body exits the electrodeposition liquid and moves further away from the latter to cause the electrodeposition liquid and cleaning liquid attached to the vehicle body to quickly drop off.

In other words, the electrodeposition liquid and cleaning liquid can be quickly discharged from the vehicle body by multiplier or synergy effects of speed increase, acceleration, angle increase and angular velocity.

The high-speed conveyance mechanism may be a chain sprocket or a high-speed cylinder unit. Types of the mechanism may be changed as needed.

Other than the guide mechanism, as means for changing the tank-exiting angle, a mechanism may be provided to each hanger for tilting the vehicle body. Alternatively, the hangers may be arranged to tilt in their entireties. The means may be changed arbitrarily as need.

The vehicle body conveyance mechanism can be either an overhead conveyers having hangers as their main components or a conveyer system disposed on a floor. Types and forms of the mechanism do not count.

Further, in a coating line used for multiple types of vehicle bodies, the timing to change the tank-entering speed and the tank-exiting speed may be changed depending on the types of vehicle bodies to be conveyed.

Next, a desirable alteration of the guide mechanism 23 will be discussed with reference to FIGS. 6 and 7.

Figure 6:
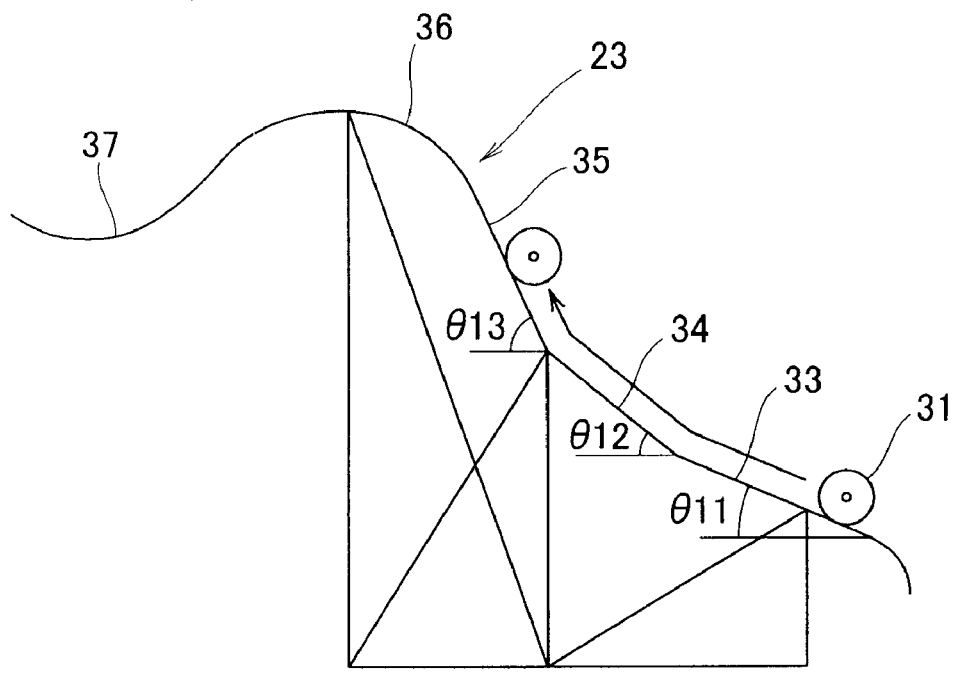
FIG. 6 illustrates an alteration of a guide mechanism.

As shown in FIG. 6, the guide mechanism 23 comprise: a first slope part 33 having a tilt or inclination angle of θ11; a second slope part 34 continuing from the first slope part 33 and having a tilt angle of θ12 larger than the tilt angle θ11; a third slope part 35 continuing from the second slope part 34 and having a tilt angle of θ13 larger than the tilt angle θ12; a hill part 36 continuing from the third slope part 35; and a valley part 37 continuing from the third slope part 36.

As the roller 31 moves past the first slope part 33, the second slope part 34 and the third slope part 35, the tilt angle of the vehicle body increases twice.

Owing to the increasing angle and the sudden positional changes of the vehicle body in association with the angle variation, it becomes possible to swiftly discharge the electrodeposition liquid remaining at a location where a curved structure is formed by a middle cross-member and a tire pan.

In addition, the vehicle body is inclined and vertically swung in that state by the effect of the hill part 36 and the valley part 37. This action facilitates liquid removal and enables effective removal of the steel powders attached to the vehicle body.

Figure 7:
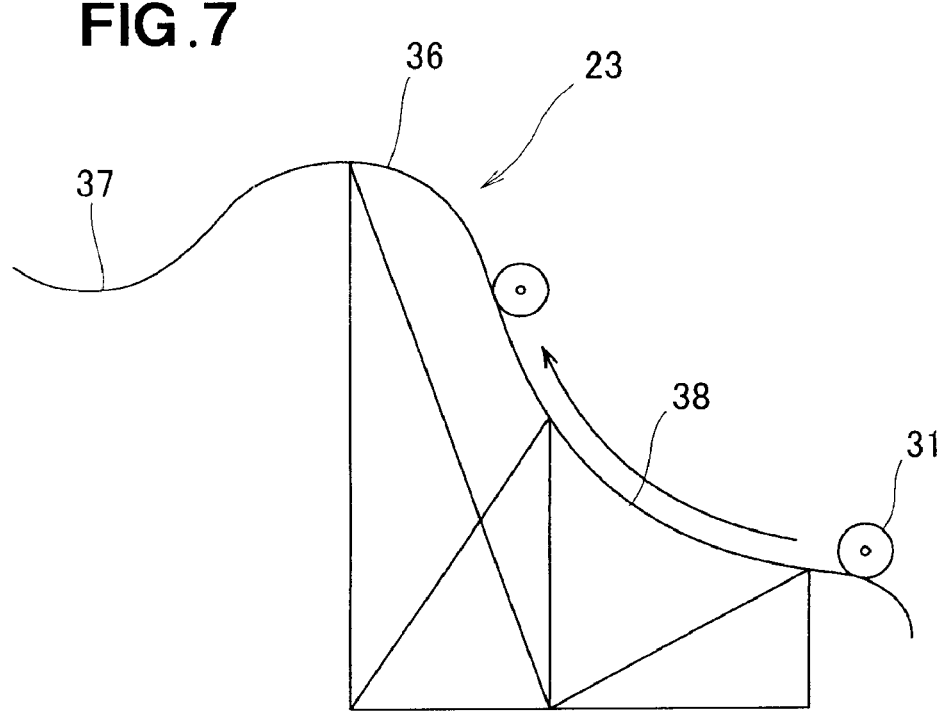
FIG. 7 illustrates a further alteration of the guide mechanism.
Figure 8:
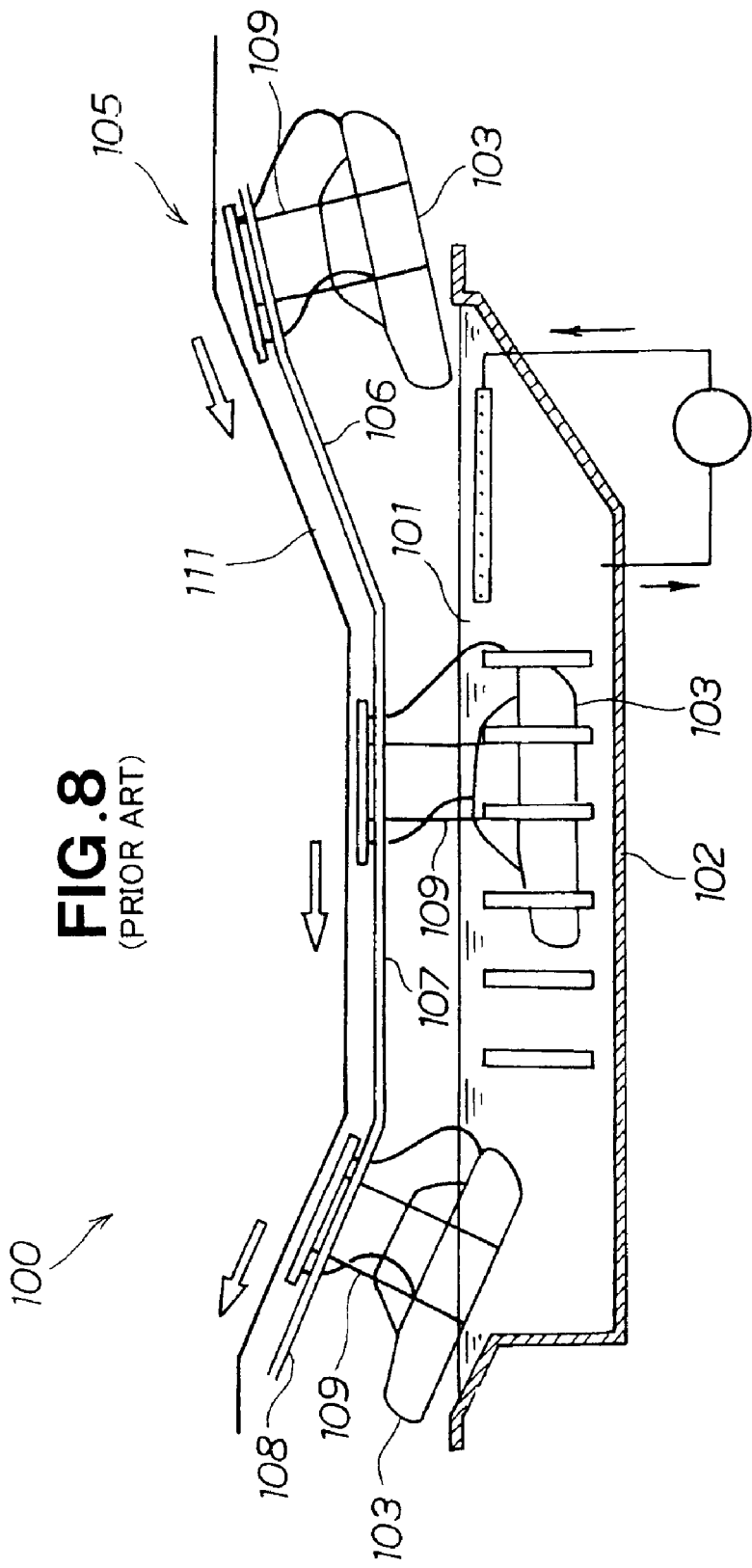
FIG. 8 illustrates a conventional immersion treatment apparatus for vehicle bodies.

As shown in FIG. 7, the guide mechanism 23 comprises: a quadratic-curve surface 38; a hill part 36 continuing from the quadratic-curve surface 38; and a valley part 37 continuing from the hill part 36.

As the roller 31 moves past the quadratic-curve surface 38, the inclination or tilt angle of the vehicle body increases continuously. Alternatively, the quadratic curve may be a higher-function curve such as third- and fourth-order curves.

Owing to the increasing tilt angle and the sudden positional changes of the vehicle body in association with the angle variation, it becomes possible to swiftly discharge the electrodeposition liquid remaining in the vehicle body.

In the arrangement of FIG. 6, the tilt angle is set to increase stepwise while in the arrangement of FIG. 7, it is set to increase smoothly. In either case, the tilt angle is increased continuously.

Although the guide mechanism has been described to be installed at a position where the vehicle body is just pulled out from the liquid storage tank, it may be disposed such that a front part of the mechanism is extended into the liquid storage tank.

It is desirable that the guide mechanism 23 be altered to have a differently patterned slope surface and a different number of the hill parts and valley parts, depending on the types of the vehicle bodies. To that effect, the guide mechanism may be arranged to be automatically replaceable, thereby providing improving advantageous effects of the invention.

INDUSTRIAL APPLICABILITY

The present inventive is particularly suited for use in an installation for electrodeposition coating of vehicle bodies.

The invention claimed is:

1. A method for immersion treating a vehicle body, comprising the steps of:
    immersing the vehicle body inclinedly into a liquid contained in a liquid storage tank, said liquid being one of an electrodeposition liquid for electrodeposition coating and a cleaning liquid for pre-coating cleaning;
    conveying the vehicle body through the liquid; and
    pulling the vehicle body inclinedly out of the liquid,
    wherein a speed at which the vehicle body is inclinedly pulled out from the liquid is higher than a speed at which the vehicle body is inclinedly immersed into the liquid and a speed at which the vehicle body is conveyed through the liquid.

2. The method for immersion treating a vehicle body according to claim 1, wherein
    the vehicle body is conveyed through the liquid at a first speed,
    the vehicle body is inclinedly pulled out from the liquid at a second speed, said second speed being greater than said first speed, and
    while conveying the vehicle body through the liquid and prior to pulling the vehicle body inclinedly out of the liquid, the vehicle body is moved inclinedly upward at the first speed.

3. The method for immersion treating a vehicle body according to claim 2, further comprising the step of:
    while the vehicle body is being inclinedly pulled out from the liquid, abutting the vehicle body with a guide mechanism, the abutment of the vehicle body with the guide mechanism causing a tilt angle of the vehicle body to increase as the vehicle body is inclinedly pulled out from the liquid.

4. The method for immersion treating a vehicle body according to claim 3, wherein the vehicle body is carried by a hanger, and the vehicle body and the hanger are integrally inclinedly immersed into the liquid, conveyed through the liquid, and inclinedly pulled out from the liquid, and the hanger directly abuts the guide mechanism causing a tilt angle of the hanger and the vehicle body to increase as the hanger and the vehicle body are inclinedly pulled out from the liquid.

5. The method for immersion treating a vehicle body according to claim 4, wherein the guide mechanism is fixedly disposed relative to the vehicle body and the hanger in a path of conveyance of the vehicle body.

6. The method for immersion treating a vehicle body according to claim 4, wherein the guide mechanism is fixedly disposed relative to the vehicle body and the hanger in the path of conveyance of the vehicle body.

7. The method for immersion treating a vehicle body according to claim 1, further comprising the step of:
    while the vehicle body is being inclinedly pulled out from the liquid, abutting the vehicle body with a guide mechanism, the abutment of the vehicle body with the guide mechanism causing a tilt angle of the vehicle body to increase as the vehicle body is pulled out from the liquid.

8. The method for immersion treating a vehicle body according to claim 7, wherein the vehicle body is carried by a hanger, and the vehicle body and the hanger are integrally inclinedly immersed into the liquid, conveyed through the liquid, and inclinedly pulled from the liquid, and the hanger directly abuts the guide mechanism causing a tilt angle of the hanger and the vehicle body to increase as the hanger and the vehicle body are inclinedly pulled out from the liquid.

9. The method for immersion treating a vehicle body according to claim 8, wherein the guide mechanism is fixedly disposed relative to the vehicle body and the hanger in a path of conveyance of the vehicle body.

10. A method for immersion treating a vehicle body, comprising the steps of:
    immersing the vehicle body inclinedly into a liquid contained in a liquid storage tank, said liquid being one of an electrodeposition liquid for electrodeposition coating and a cleaning liquid for pre-coating cleaning;
    conveying the vehicle body within the liquid;
    pulling the vehicle body inclinedly out from the liquid; and
    while the vehicle body is being inclinedly pulled out from the liquid, abutting the vehicle body with a guide mechanism, the abutment of the vehicle body with the guide mechanism causing a tilt angle of the vehicle body to increase as the vehicle body is inclinedly pulled out from the liquid.

11. The method for immersion treating a vehicle body according to claim 10, wherein the guide mechanism is fixedly disposed relative to the vehicle body and the hanger in a path of conveyance of the vehicle body.

12. The method for immersion treating a vehicle body according to claim 10, wherein
   the vehicle body is conveyed within the liquid at a first tilt angle,
   the vehicle body is pulled out from the liquid at a second tilt angle prior to the vehicle body abutting the guide mechanism, the second tilt angle being greater than the first tilt angle, and
   the vehicle body is pulled out from the liquid at a third tilt angle after abutting the guide mechanism, the third tilt angle being greater than the second tilt angle.

13. An apparatus for immersion treating a vehicle body by immersing the vehicle body into a liquid, the liquid being one of an electrodeposition liquid for electrodeposition coating and a cleaning liquid for pre-coating cleaning, comprising:
   a liquid storage tank for storing the liquid;
   a vehicle body conveyance mechanism for conveying the vehicle body at a predetermined speed such that the vehicle body is inclinedly immersed into the liquid, conveyed through the liquid, and inclinedly pulled out from the liquid; and
   a high-speed conveyance mechanism provided to the vehicle body conveyance mechanism, for conveying the vehicle body, as the vehicle body is inclinedly pulled out from the liquid, at a speed higher than the predetermined speed, the high-speed conveyance mechanism provided only to a portion of the vehicle body conveyance mechanism which conveys the vehicle body as the vehicle body is inclinedly pulled out from the liquid, such that the vehicle body conveyance mechanism and the high-speed conveyance mechanism are configured to convey the vehicle body at the speed higher than the predetermined speed when being inclinedly pulled out from the liquid, and to convey the vehicle body at the predetermined speed when the vehicle body is inclinedly immersed into the liquid and conveyed through the liquid.

14. The immersion treatment apparatus of claim 13, further comprising a guide mechanism for tilting the vehicle body such that an angle of inclination of the vehicle body after exiting the liquid increases, the guide mechanism disposed in a path of conveyance of the vehicle body conveyance mechanism and the high-speed conveyance mechanism at a position where the vehicle body is made to abut the guide mechanism as the vehicle body is conveyed by the vehicle body conveyance mechanism and the high-speed conveyance mechanism, the guide mechanism configured such that the abutment of the vehicle body to the guide mechanism causes the angle of inclination of the vehicle body to increase.

15. The immersion treatment apparatus of claim 14, wherein the guide mechanism is designed to cause the inclination angle of the vehicle body after exiting the liquid to increase continuously.

16. The immersion treatment apparatus of claim 14, further comprising a hanger for carrying the vehicle body, wherein the vehicle body conveyance mechanism and the high-speed conveyance mechanism integrally convey the hanger and the vehicle body, and the guide mechanism is positioned to directly abut the hanger.

* * * * *